United States Patent
Singh et al.

(10) Patent No.: US 11,487,047 B2
(45) Date of Patent: Nov. 1, 2022

(54) FORECASTING ENVIRONMENTAL OCCLUSION EVENTS

(71) Applicant: International Business Machines Corporation, Armonk, NY (US)

(72) Inventors: Jitendra Singh, Noida (IN); Mukul Tewari, Lafayette, CO (US); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/930,195

(22) Filed: Jul. 15, 2020

(65) Prior Publication Data

US 2022/0018989 A1 Jan. 20, 2022

(51) Int. Cl.
| | |
|---|---|
| *G01W 1/10* | (2006.01) |
| *G06F 17/18* | (2006.01) |
| *G06N 20/00* | (2019.01) |
| *G06K 9/62* | (2022.01) |
| *G06V 10/25* | (2022.01) |

(52) U.S. Cl.
CPC .............. *G01W 1/10* (2013.01); *G06F 17/18* (2013.01); *G06K 9/6221* (2013.01); *G06N 20/00* (2019.01); *G06V 10/25* (2022.01)

(58) Field of Classification Search
CPC ......... G01W 1/10; G06N 20/00; G06V 10/25; G06F 17/18; G06K 9/6221
See application file for complete search history.

(56) References Cited

U.S. PATENT DOCUMENTS

| | | | |
|---|---|---|---|
| 9,131,644 B2 | 9/2015 | Osborne | |
| 10,592,780 B2 * | 3/2020 | Gurvich | ............... G06V 10/454 |
| 2011/0295575 A1 * | 12/2011 | Levine | .................... G06F 30/20 |
| | | | 703/2 |
| 2014/0347475 A1 * | 11/2014 | Divakaran | ............. G06V 20/52 |
| | | | 348/135 |
| 2015/0269438 A1 * | 9/2015 | Samarasekera | ...... G08G 5/0069 |
| | | | 382/154 |
| 2018/0146624 A1 | 5/2018 | Chen | |

(Continued)

FOREIGN PATENT DOCUMENTS

| | | |
|---|---|---|
| CN | 106657401 B | 5/2017 |
| WO | 2016029054 A1 | 2/2016 |

OTHER PUBLICATIONS

Dawson et al., "Impact of the Environmental Low-Level Wind Profile on Ensemble Forecasts of the May 4, 2007 Greensburg, Kansas, Tornadic Storm and Associated Mesocyclones," Monthly Weather Review, vol. 140, DOI: 10.1175/MWR-D-11-00008.1, © 2012 American Meteorological Society, 22 pages.

(Continued)

*Primary Examiner* — Raymond L Nimox
(74) *Attorney, Agent, or Firm* — Stephanie L. Carusillo (57) ABSTRACT

In an approach for forecasting environmental occlusion events, a processor receives a spatio-temporal zone of interest. A processor collects data associated with the spatio-temporal zone of interest. A processor builds a machine-learning model using the data. A processor generates an occlusion probability map for the spatio-temporal zone of interest based on the machine-learning model and enriched mathematical operators. A processor outputs the occlusion probability map.

19 Claims, 4 Drawing Sheets

(56) References Cited

U.S. PATENT DOCUMENTS

| | | | | |
|---|---|---|---|---|
| 2018/0300576 A1* | 10/2018 | Dalyac | ................ | G06K 9/6218 |
| 2020/0155882 A1* | 5/2020 | Tohidi | .................... | G06N 7/005 |
| 2020/0285977 A1* | 9/2020 | Brebner | ................ | G06N 5/022 |
| 2020/0348448 A1* | 11/2020 | Tocornal | .............. | G06N 3/0445 |
| 2020/0372349 A1* | 11/2020 | Gaitan Ospina | ..... | G06N 3/0445 |
| 2020/0394499 A1* | 12/2020 | Yao | ....................... | G06N 3/0454 |
| 2021/0063214 A1* | 3/2021 | Li | ....................... | G08B 21/0492 |
| 2021/0065891 A1* | 3/2021 | Li | ........................ | A61B 5/1123 |
| 2021/0181758 A1* | 6/2021 | Das | ........................ | G01S 17/931 |
| 2021/0237761 A1* | 8/2021 | Das | ........................ | G06V 10/25 |

OTHER PUBLICATIONS

Kremer et al., "Yara and IBM join forces to transform the future of farming", Apr. 26, 2019, Yara International ASA, Oslo—Norway, 2 pages, <https://www.yara.com/corporate-releases/yara-and-ibm-join-forces-to-transform-the-future-of-framing/>.

* cited by examiner

| LABEL | CLASSIFICATION |
|---|---|
| 0 | NO_DATA |
| 1 | SATURATED_OR_DEFECTIVE |
| 2 | DARK_AREA_PIXELS |
| 3 | CLOUD_SHADOWS |
| 4 | VEGETATION |
| 5 | NOT_VEGETATED |
| 6 | WATER |
| 7 | UNCLASSIFIED |
| 8 | CLOUD_MEDIUM_PROBABILITY |
| 9 | CLOUD_HIGH_PROBABILITY |
| 10 | THIN_CIRRUS |
| 11 | SNOW |

FORECASTING ENVIRONMENTAL OCCLUSION EVENTS

BACKGROUND

The present invention relates generally to the field of environmental forecasting, and more particularly to forecasting environmental occlusion events.

Remote sensing (aerial and space) technology is an effective, scalable, and economic technology for land, vegetation, crops, and marine monitoring. Monitoring of these environments is required in several applications, e.g., weather prediction, wildfire modeling, water turbidity, etc. Similarly, in agriculture, remote sensing data is valuable for crop monitoring (types of crops, crop health and growth stages), yield estimations, etc. These applications extensively use optical sensing (passive sensing) for remote monitoring.

SUMMARY

Aspects of an embodiment of the present invention disclose a method, computer program product, and computer system for forecasting environmental occlusion events. A processor receives a spatio-temporal zone of interest. A processor collects data associated with the spatio-temporal zone of interest. A processor builds a machine-learning model using the data. A processor generates an occlusion probability map for the spatio-temporal zone of interest based on the machine-learning model and enriched mathematical operators. A processor outputs the occlusion probability map.

In some aspects of an embodiment of the present invention, a processor receives the spatio-temporal zone of interest from a user computing device in which a user through a user interface selected the spatio temporal zone of interest using a spatial polygon or a bounding box on a geographical map, wherein the spatio-temporal zone of interest consists of a geo-spatial location and temporal period.

In some aspects of an embodiment of the present invention, the data comprises historical scene classification maps from remote sensing data for the spatio-temporal zone of interest and historical weather and environmental forecasts for the spatio-temporal zone of interest.

In some aspects of an embodiment of the present invention, the machine-learning regression model is configured to determine an occlusion type, occlusion intensity, and occlusion probability for the spatio-temporal zone of interest.

In some aspects of an embodiment of the present invention, a processor creates a spatial segment at a smallest spatial resolution to be supported by the machine-learning regression model. A processor creates a temporal unit at a smallest time segment unit to be supported by the by the machine-learning regression model. For each spatial segment and temporal unit, a processor trains the machine-learning regression model on the data.

In some aspects of an embodiment of the present invention, the enriched mathematical operators are configured to aggregate or disaggregate occlusion probabilities produced by the machine-learning regression model based on a spatial segment size and time segment size used by the machine-learning regression model compared to a granularity of a geo-spatial location and a temporal period of the spatio-temporal zone of interest.

In some aspects of an embodiment of the present invention, a processor shades the occlusion probability map using dark to light coloring depending on an intensity or time duration of a predicted occlusion. A processor clusters different occlusion types and occlusion intensities on the occlusion probability map.

DETAILED DESCRIPTION

Embodiments of the present invention recognize that optical sensing used for remote monitoring can be hampered by environmental occlusion factors or events, i.e., clouds, pollution, dust, fog, etc. Environmental occlusion factors or events include environmental conditions that cause object occlusion, i.e., an object being monitored or tracked via remote sensing is hidden by another object, or, in this situation, by some environmental event. Embodiments of the present invention recognize the need to be able to forecast environmental occlusion events, and more specifically forecast the location, intensity, and time window of an environmental occlusion event, for remote sensing data service providers to better plan operations and for consumers of the remote sensing data for their monitoring applications.

Embodiments of the present invention provide a system and associated methods for forecasting a location, intensity, and time window of an environmental occlusion event to better manage remote sensing monitoring plans for both data providers and down-stream data consumers. Embodiments of the present invention utilize spatio-temporal machine-learning models to forecast the location, intensity, and time window of an environmental occlusion event for a region of interest, i.e., area being monitored using remote sensing. Embodiments of the present invention utilize historical and forecasted high resolution weather geospatial data to model clouds, fog, pollution, and any other environmental conditions that could lead to occlusion for remote sensing. Embodiments of the present invention utilize historical remote sensing images, in particular the pixel wise scene classification layer of the remote sensing images.

Embodiments of the present invention generate occlusion probability maps at varying spatial and temporal resolutions. Embodiments of the present invention create geo-location segment predicted occlusion units for different temporal spans using mathematical operators enriched with domain-semantics for viewing multiple units at user-chosen granularity. Embodiments of the present invention provide a query engine for users to specify a spatio-temporal zone (geolocation and time) of occlusion probability, and in response, embodiments of the present invention generate a visual heatmap of expected occlusions.

The present invention will now be described in detail with reference to the Figures.

Figure 1:
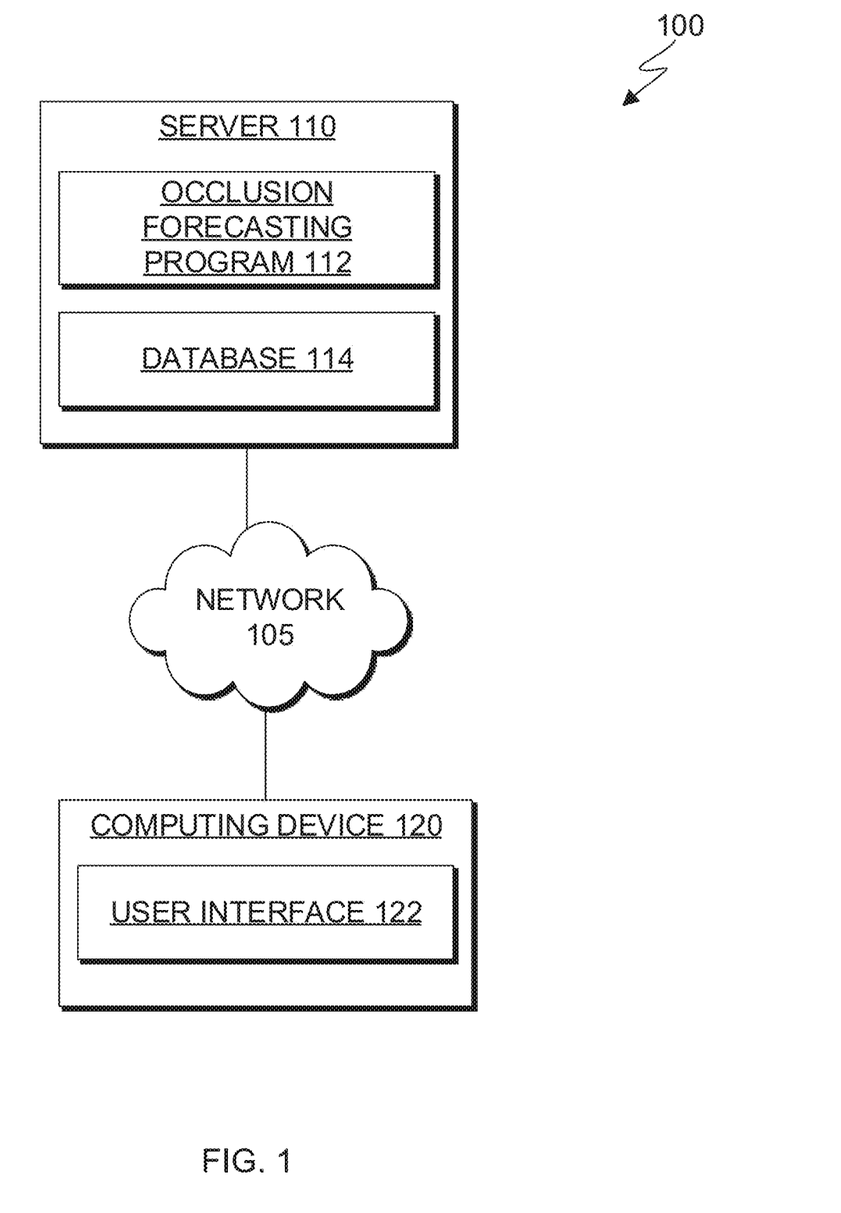
FIG. 1 depicts a block diagram of a distributed data processing environment, in accordance with an embodiment of the present invention.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110 and computing device 120 interconnected over network 105. In an embodiment, distributed data processing environment 100 represents a system for forecasting environmental occlusion events effecting remote sensing monitoring plans. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110 and computing device 120. Distributed data processing environment 100 may include additional servers, computers, or other devices not shown.

Server 110 operates to run occlusion forecasting program 112 and manage database 114. In the depicted embodiment, server 110 contains occlusion forecasting program 112 and database 114. In some embodiments, server 110 can be a standalone computing device, a management server, a web server, a mobile computing device, or any other electronic device or computing system capable of receiving, sending, and processing data. In some embodiments, server 110 may be a laptop computer, tablet computer, netbook computer, personal computer (PC), a desktop computer, a smart phone, or any programmable electronic device capable of communicating with computing device 120 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 4.

Occlusion forecasting program 112 operates to forecast environmental occlusion events that would have an impact on remote sensing monitoring plans. In an embodiment, occlusion forecasting program 112 receives a spatio-temporal zone of interest, collects data related to the spatio-temporal zone of interest, builds a spatio-temporal machine learning model, generates a geo-spatial occlusion map, and outputs the geo-spatial occlusion map. In the depicted embodiment, occlusion forecasting program 112 resides on server 110 with user interface 122 being the local app interface of occlusion forecasting program 112 on computing device 120. In other embodiments, occlusion forecasting program 112 may reside on another device (not shown) provided that occlusion forecasting program 112 has access to network 105. Occlusion forecasting program 112 is described in more detail below with reference to FIG. 2.

Database 114 operates as a repository for data received, used, and/or output by occlusion forecasting program 112. Data received, used, and/or generated may include, but is not limited to, spatio-temporal zones of interest, historical scene classification maps, remote sensing data, historical weather and weather forecasts, generated occlusion maps, and any other data received, used, and/or output by occlusion forecasting program 112. Database 114 can be implemented with any type of storage device capable of storing data and configuration files that can be accessed and utilized by server 110, such as a hard disk drive, a database server, or a flash memory. In an embodiment, database 114 is accessed by server 110, occlusion forecasting program 112, and/or computing device 120 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

Computing device 120 operates to send and receive data through a user interface 122. In some embodiments, computing device 120 may be, but is not limited to, an electronic device, such as a laptop computer, a tablet computer, a netbook computer, a personal computer (PC), a desktop computer, a smart phone, or any programmable electronic device capable of running user interface 122 and communicating (i.e., sending and receiving data) with server 110 and/or occlusion forecasting program 112 via network 105. In some embodiments, computing device 120 represents one or more programmable electronic devices or combination of programmable electronic devices capable of executing machine readable program instructions and communicating with server 110 and/or other computing devices within distributed data processing environment 100 via a network, such as network 105. In an embodiment, computing device 120 represents one or more devices associated with a user. In the depicted embodiment, computing device 120 includes an instance of user interface 122. Computing device 120 may include components as described in further detail in FIG. 4.

User interface 122 operates as a local user interface on computing device 120 through which one or more users of computing device 120 interact with computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from occlusion forecasting program 112 via network 105. In an embodiment, user interface 122 enables a user to send and receive data (i.e., to and from occlusion forecasting program 112 via network 105, respectively). In an embodiment, user interface 122 displays, presents, or enables a user to input a spatio-temporal zone of interest, e.g., using a spatial polygon and/or a bounding box on a geographical map displayed on user interface 122. In an embodiment, user interface 122 displays, presents, or enables a user to view a generated geo-spatial occlusion map.

Figure 2:
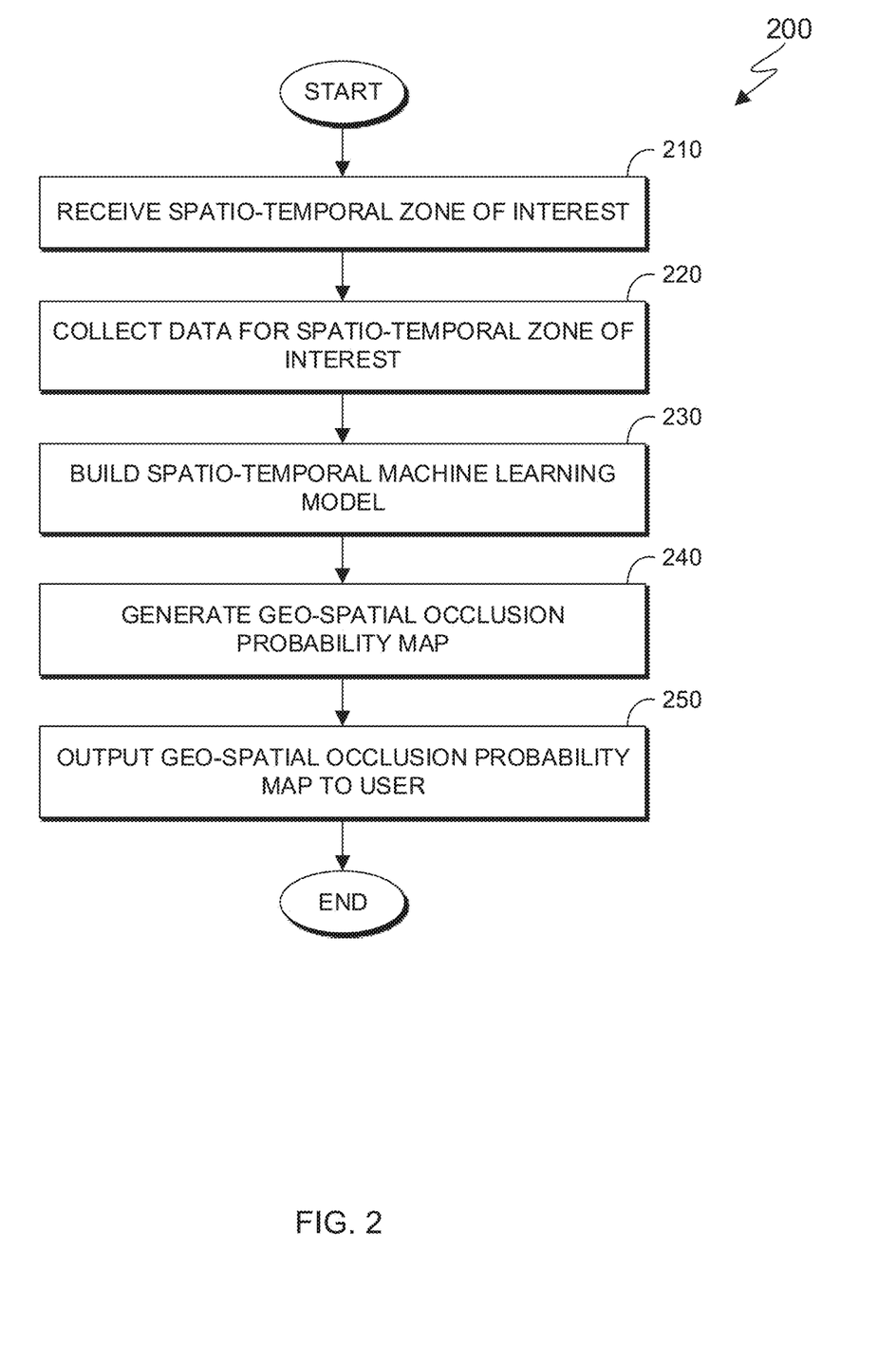
FIG. 2 depicts a flowchart of the steps of an occlusion forecasting program, for forecasting environmental occlusion events effecting remote sensing monitoring plans, in accordance with an embodiment of the present invention.

FIG. 2 depicts a flowchart 200 of the steps of occlusion forecasting program 112, in accordance with an embodiment of the present invention. In the depicted embodiment, occlusion forecasting program 112 receives a spatio-temporal zone of interest, collects data related to the spatio-temporal zone of interest, builds a spatio-temporal machine learning model, generates a geo-spatial occlusion map, and outputs the geo-spatial occlusion map. It should be appreciated that the process depicted in FIG. 2 illustrates one possible iteration of occlusion forecasting program 112, which can repeat for each received spatio-temporal zone of interest.

In step 210, occlusion forecasting program 112 receives a spatio-temporal zone of interest. In an embodiment, occlusion forecasting program 112 receives a spatio-temporal zone of interest broken down as a target area (geo-spatial location) and target time period (temporal zone) specified by a user through a local app user interface of occlusion forecasting program 112, e.g., user interface 122 of computing device 120. In an embodiment, user interface 122 enables a user of computing device 120 to select a spatio-temporal zone of interest to input into occlusion forecasting program 112. In an embodiment, user interface 122 enables a user of computing device 120 to select a spatio-temporal zone of interest using a spatial polygon and/or a bounding box on a geographical map. In another embodiment, occlusion forecasting program 112 receives a selected spatio-temporal zone of interest from another computing device (not shown).

Figure 3:
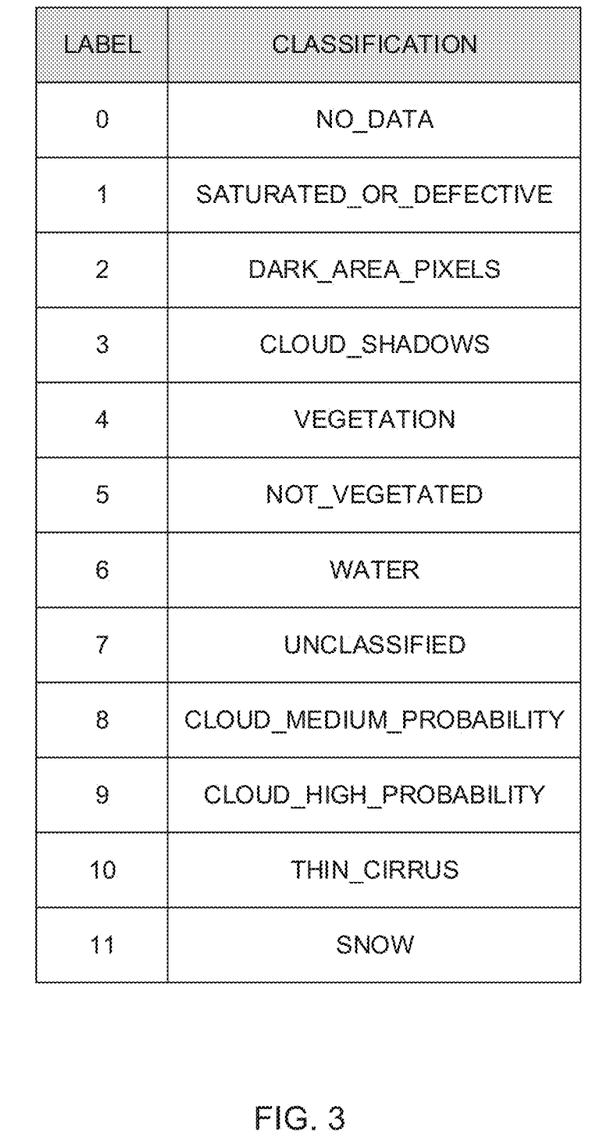
FIG. 3 depicts an exemplary table of labels and classifications used for input data of occlusion forecasting program, in accordance with an embodiment of the present invention.

In step 220, occlusion forecasting program 112 collects data related to the spatio-temporal zone of interest. In an embodiment, occlusion forecasting program 112 collects historical scene classification maps for the spatio-temporal zone of interest from remote sensing data, which includes data attributes (environmental conditions), e.g., vegetation types, cloud cover, etc. FIG. 3 depicts an exemplary set of classifications of environmental conditions that occlusion forecasting program 112 can collect from historical scene classification maps generated from collected remote sensing data. In an embodiment, occlusion forecasting program 112 collects historical weather and environmental forecasts of conditions including, but not limited to, surface temperature, cloud cover (type and intensity), wind speed and direction, fog/smog/mist/smoke/dust, and pollution level/index for the spatio-temporal zone of interest and neighboring areas. In an embodiment, data attributes (environmental conditions) of the historical weather and environmental forecast data, e.g., surface temperature, pressure, wind speed, act as learning attributes and corresponding historical scene classification data points act as training labels. For example, FIG. 3 depicts a set of labels 0-11 with corresponding classifications, i.e., no data, cloud shadows, vegetation, water, snow, etc., that can correspond with data attributes (environmental conditions) from the historical scene classification maps.

In step 230, occlusion forecasting program 112 builds a spatio-temporal machine learning (ML) model. In an embodiment, occlusion forecasting program 112 builds a spatio-temporal ML model for predicting environmental occlusion events for the spatio-temporal zone of interest. In an embodiment, occlusion forecasting program 112 builds a spatio-temporal ML model that can determine an occlusion type, occlusion intensity, and occlusion probability for the spatio-temporal zone of interest. In an embodiment, occlusion forecasting program 112 creates a spatial segment at a smallest spatial resolution to be supported by the ML model, e.g., 10 meters by 10 meters equals 100 square meters. It should be appreciated by a person of skill in the art that remote sensing data is publicly available at very high spatial/pixel resolution, e.g., Sentinel missions from the European Space Agency. In an embodiment, occlusion forecasting program 112 creates a temporal unit at a smallest time segment unit to be supported by the system, e.g., 1 minute, 10 minutes, 1 hour. In an embodiment, for each spatial segment and temporal unit, occlusion forecasting program 112 learns using a ML regression model, e.g., support vector regressor. In an embodiment, for each spatial segment and temporal unit, occlusion forecasting program 112 trains the ML regression model on the data collected in the previous step with the data attributes (environmental conditions) of the historical weather and environmental forecast data acting as the inputs (learning attributes) and corresponding historical scene classification data points acting as training labels.

In step 240, occlusion forecasting program 112 generates a geo-spatial occlusion map. In an embodiment, occlusion forecasting program 112 generates a geo-spatial occlusion map (visual heat map) for the spatio-temporal zone of interest to show occlusion probability using the spatio-temporal ML model and enriched mathematical operators. In an embodiment, occlusion forecasting program 112 performs an inference for the spatio-temporal zone of interest using the spatio-temporal ML model. In an embodiment, for a chosen spatial segment and temporal unit, occlusion forecasting program 112 uses the ML model to infer a confidence score distribution for a probability of a given level of occlusion at a point in time. In an embodiment, for each spatial segment, occlusion forecasting program 112 arranges predicted values and confidences of all the temporal segment units in form of a time-series, i.e., a 2D vector/matrix with the time series as one dimension and the probability distribution of the predicted classification labels as the second dimension. In an embodiment, occlusion forecasting program 112 choses the first (most probable) vector units as the expected occlusion conditions in the upcoming period for each given spatial zone, and the vector (column of the matrix) is delivered as the occlusion probability.

In some embodiments, occlusion forecasting program 112 shades the geo-spatial occlusion map using dark to light coloring depending on the intensity and/or time duration of a predicted occlusion. In some embodiments, occlusion forecasting program 112 creates clusters for different occlusion types and occlusion intensities on the geo-spatial map.

In an embodiment, occlusion forecasting program 112 utilizes mathematical operators enriched with domain-semantics that enable viewing of multiple geo-spatial and temporal units at a user-chosen (i.e., the input spatio-temporal zone of interest) granularity and take probability values into account. In other words, if the user-chosen spatio-temporal zone of interest was a square mile bounding box over a three-hour time period, occlusion forecasting program 112 utilizes the enriched mathematical operators to aggregate or disaggregate occlusion probabilities produced by the ML model, based on the granularity of the spatial segment and time segment sizes used by the ML model compared to the granularity of the spatio-temporal zone of interest.

In an embodiment, occlusion forecasting program 112 utilizes an addition (+ or plus) operator to aggregate occlusion probabilities. For an input (i.e., the spatio-temporal zone of interest) of different geo-spatial segment units, and optionally a set of time segment units, occlusion forecasting program 112 utilizes the addition operator to compute the set union of all the geo-spatial segment units to compute the area covered by the spatio-temporal zone of interest. For unique areas, and optionally for each time segment, occlusion forecasting program 112 utilizes the addition operator to compute the maximum and minimum likelihood of occlusion occurring and intensities of occlusions over the specified spatio-temporal zone of interest.

In an embodiment, occlusion forecasting program 112 utilizes a subtraction (− or minus) operator to disaggregate occlusion probabilities. For an input (i.e., the spatio-temporal zone of interest) of one "from" geo-spatial location unit (i.e., a larger geo-spatial unit) and one or more "to" geo-spatial location unit(s) (i.e., a smaller geo-spatial unit, typically a subset of the larger geo-spatial unit), and optionally a set of time slots, occlusion forecasting program 112 utilizes the subtraction operator to compute the set difference of all the geo-spatial segment units to compute the area covered by the spatio-temporal zone of interest by subtracting the "to" unit(s) from the "from" unit to obtain the resultant set of (i.e., remaining) geo-locations. For the resultant set of geo-locations, and optionally for each time segment, occlusion forecasting program 112 utilizes the subtraction operator to compute the maximum and minimum likelihood of occlusion occurring and intensities of occlusions over the specified spatio-temporal zone of interest.

In step 250, occlusion forecasting program 112 outputs the geo-spatial occlusion map. In an embodiment, occlusion forecasting program 112 outputs the geo-spatial occlusion map to a user through user interface 122 of computing device 120. In an embodiment, occlusion forecasting program 112 outputs the geo-spatial occlusion map (visual heat map) depicting occlusion probability for the spatio-temporal zone of interest. In an embodiment, occlusion forecasting program 112 enables a user through user interface 122 to easily touch or click on a cluster of a specific type of occlusion. For example, when the user clicks on one geo-spatial unit segment, all other geo-spatial units that have been clustered with a similar occlusion predicted possibility are selected and/or highlighted. Continuing the example, for the one geo-spatial unit selected by the user, the user can also browse through different periods of time to see the occlusion probabilities and how that unit is clustered over a period of time.

Figure 4:
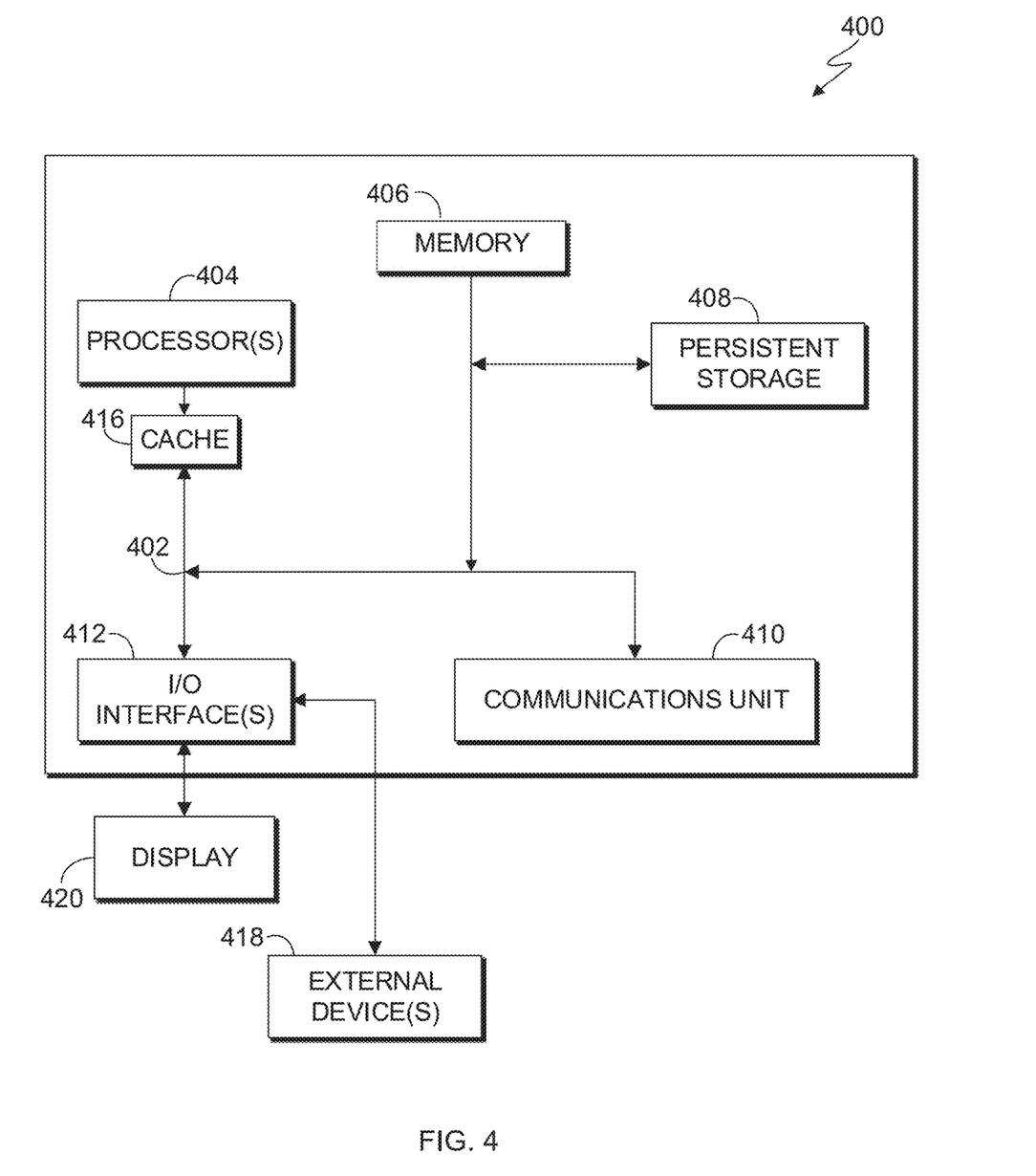
FIG. 4 depicts a block diagram of a computing device of the distributed data processing environment, in accordance with an embodiment of the present invention.

FIG. 4 depicts a block diagram of components of computing device 400 suitable for server 110 and/or computing device 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 110 and/or computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for forecasting environmental occlusion events, the computer-implemented method comprising:

receiving, by one or more processors, a spatio-temporal zone of interest;

collecting, by the one or more processors, data associated with the spatio-temporal zone of interest;

building, by the one or more processors, a machine-learning regression model for predicting environmental occlusion events for the spatio-temporal zone of interest using the data, wherein each predicted environmental occlusion event includes an occlusion type, an occlusion intensity, and an occlusion probability for the spatio-temporal zone of interest;

generating, by the one or more processors, an occlusion probability map for the spatio-temporal zone of interest based on the machine-learning model and enriched mathematical operators; and outputting, by the one or more processors, the occlusion probability map.

2. The computer-implemented method of claim 1, wherein receiving the spatio-temporal zone of interest further comprises:
receiving, by the one or more processors, the spatio-temporal zone of interest from a user computing device in which a user through a user interface selected the spatio temporal zone of interest using a spatial polygon or a bounding box on a geographical map, wherein the spatio-temporal zone of interest consists of a geo-spatial location and temporal period.

3. The computer-implemented method of claim 1, wherein the data comprises historical scene classification maps from remote sensing data for the spatio-temporal zone of interest and historical weather and environmental forecasts for the spatio-temporal zone of interest.

4. The computer-implemented method of claim 1, wherein building the machine-learning regression model using the data comprises:
creating, by the one or more processors, a spatial segment at a smallest spatial resolution to be supported by the machine-learning regression model;
creating, by the one or more processors, a temporal unit at a smallest time segment unit to be supported by the machine-learning regression model; and
for each spatial segment and each temporal unit, training, by the one or more processors, the machine-learning regression model on the data.

5. The computer-implemented method of claim 1, wherein the enriched mathematical operators are configured to aggregate or disaggregate occlusion probabilities produced by the machine-learning regression model based on a spatial segment size and time segment size used by the machine-learning regression model compared to a granularity of a geo-spatial location and a temporal period of the spatio-temporal zone of interest.

6. The computer-implemented method of claim 1, wherein generating the occlusion probability map for the spatio-temporal zone of interest based on the machine-learning model and the enriched mathematical operators comprises:
shading, by the one or more processors, the occlusion probability map using dark to light coloring depending on an intensity or time duration of a predicted occlusion; and
clustering, by the one or more processors, different occlusion types and occlusion intensities for the spatio-temporal zone of interest on the occlusion probability map.

7. A computer program product for forecasting environmental occlusion events, the computer program product comprising:
one or more computer readable tangible storage devices and program instructions stored on the one or more computer readable tangible storage devices, the program instructions comprising:
program instructions to receive a spatio-temporal zone of interest;
program instructions to collect data associated with the spatio-temporal zone of interest;
program instructions to build a machine-learning regression model using the data for predicting environmental occlusion events for the spatio-temporal zone of interest using the data, wherein each predicted environmental occlusion event includes an occlusion type, an occlusion intensity, and an occlusion probability for the spatio-temporal zone of interest;
program instructions to generate an occlusion probability map for the spatio-temporal zone of interest based on the machine-learning model and enriched mathematical operators; and
program instructions to output the occlusion probability map.

8. The computer program product of claim 7, wherein the program instructions to receive the spatio-temporal zone of interest further comprise:
program instructions to receive the spatio-temporal zone of interest from a user computing device in which a user through a user interface selected the spatio temporal zone of interest using a spatial polygon or a bounding box on a geographical map, wherein the spatio-temporal zone of interest consists of a geo-spatial location and temporal period.

9. The computer program product of claim 7, wherein the data comprises historical scene classification maps from remote sensing data for the spatio-temporal zone of interest and historical weather and environmental forecasts for the spatio-temporal zone of interest.

10. The computer program product of claim 7, wherein the program instructions to build the machine-learning regression model using the data comprise:
program instructions to create a spatial segment at a smallest spatial resolution to be supported by the machine-learning regression model;
program instructions to create a temporal unit at a smallest time segment unit to be supported by the machine-learning regression model; and
for each spatial segment and each temporal unit, program instructions to train the machine-learning regression model on the data.

11. The computer program product of claim 7, wherein the enriched mathematical operators are configured to aggregate or disaggregate occlusion probabilities produced by the machine-learning regression model based on a spatial segment size and time segment size used by the machine-learning regression model compared to a granularity of a geo-spatial location and a temporal period of the spatio-temporal zone of interest.

12. The computer program product of claim 7, wherein the program instructions to generate the occlusion probability map for the spatio-temporal zone of interest based on the machine-learning model and the enriched mathematical operators comprise:
program instructions to shade the occlusion probability map using dark to light coloring depending on an intensity or time duration of a predicted occlusion; and
program instructions to cluster different occlusion types and occlusion intensities for the spatio-temporal zone of interest on the occlusion probability map.

13. A computer system for forecasting environmental occlusion events, the computer system comprising:
one or more computer processors;
one or more computer readable storage media;
program instructions stored on the computer readable storage media for execution by at least one of the one or more processors, the program instructions comprising:
program instructions to receive a spatio-temporal zone of interest;
program instructions to collect data associated with the spatio-temporal zone of interest;

program instructions to build a machine-learning regression model using the data for predicting environmental occlusion events for the spatio-temporal zone of interest using the data, wherein each predicted environmental occlusion event includes an occlusion type, an occlusion intensity, and an occlusion probability for the spatio-temporal zone of interest;

program instructions to generate an occlusion probability map for the spatio-temporal zone of interest based on the machine-learning model and enriched mathematical operators; and program instructions to output the occlusion probability map.

14. The computer system of claim 13, wherein the program instructions to receive the spatio-temporal zone of interest further comprise:

program instructions to receive the spatio-temporal zone of interest from a user computing device in which a user through a user interface selected the spatio temporal zone of interest using a spatial polygon or a bounding box on a geographical map, wherein the spatio-temporal zone of interest consists of a geo-spatial location and temporal period.

15. The computer system of claim 13, wherein the data comprises historical scene classification maps from remote sensing data for the spatio-temporal zone of interest and historical weather and environmental forecasts for the spatio-temporal zone of interest.

16. The computer system of claim 13, wherein the program instructions to build the machine-learning regression model using the data comprise:

program instructions to create a spatial segment at a smallest spatial resolution to be supported by the machine-learning regression model;

program instructions to create a temporal unit at a smallest time segment unit to be supported by the machine-learning regression model; and for each spatial segment and each temporal unit, program instructions to train the machine-learning regression model on the data.

17. The computer system of claim 13, wherein the enriched mathematical operators are configured to aggregate or disaggregate occlusion probabilities produced by the machine-learning regression model based on a spatial segment size and time segment size used by the machine-learning regression model compared to a granularity of a geo-spatial location and a temporal period of the spatio-temporal zone of interest.

18. The computer-implemented method of claim 3, wherein building the machine-learning regression model comprises:

training, by the one or more processors, the machine-learning regression model on the data with data attributes of the historical weather and environmental forecast data acting as inputs to the machine-learning regression model and corresponding historical scene classification data points acting as corresponding training labels.

19. The computer-implemented method of claim 1, wherein generating the occlusion probability map for the spatio-temporal zone of interest based on the machine-learning model and enriched mathematical operators comprises:

performing, by the one or more processors, an inference using the machine-learning regression model for a specified spatial segment and temporal unit to infer a confidence score distribution for a probability of a given level of occlusion at a point in time.

* * * * *